Patented Apr. 5, 1932

1,852,595

UNITED STATES PATENT OFFICE

HAROLD H. STEINOUR, OF RIVERSIDE, CALIFORNIA, ASSIGNOR TO RIVERSIDE CEMENT COMPANY, OF LOS ANGELES, CALIFORNIA, A CORPORATION OF CALIFORNIA

PORTLAND CEMENT COMPOSITION AND METHOD AND MATERIAL FOR MAKING SAME

No Drawing. Application filed October 4, 1930. Serial No. 486,513.

This invention relates to Portland cement compositions, methods of making such compositions, and materials which may be admixed with normal Portland cement to produce such compositions.

The principal object of the invention is to provide Portland cement compositions which have certain advantageous properties, as compared with other Portland cement compositions, and which may be prepared for admixture of suitable materials to normal Portland cement.

A particular object is to provide a cement composition suitable for use as an oil well cement, having both satisfactory setting properties and moderately high early strength at temperatures materially above atmospheric temperature, for example, temperatures as high as 200° F. or above, such as are frequently encountered in cementing off oil wells.

A further object is to provide a cement composition having both high early strength and satisfactory setting properties at ordinary temperatures, and particularly, one which is satisfactory from the standpoint of both early strength and setting properties throughout a wide range of temperature from ordinary atmospheric temperature up to 200° F. or above.

Cement compositions have heretofore been made or described, having the above mentioned desirable properties of moderately high early strength and satisfactory setting time, but differing considerably from Portland cement in composition of the cement constituents themselves and therefore requiring marked departures from the usual procedure of manufacturing normal Portland cement and the use of different materials, or different proportions of materials, in the raw mix. From a commercial standpoint, the manufacture of such cements is attended with certain difficulties, particularly if it is attempted to manufacture such cements at the same plant at which ordinary Portland cement is manufactured. A particular object of this invention, therefore, is to provide for making such a cement composition by simply adding a small amount of suitable admixture to normal Portland cement produced from the usual raw mix, by the standard plant procedure. An advantage which is thus obtained is that a uniform raw mix may be used and the entire cement manufacturing equipment of the plant can be operated in the regular way, so as to produce only a normal Portland cement, and any desired proportion thereof may then be treated, by addition of the admixture thereto, to make the special composition in accordance with this invention.

The addition of certain materials to Portland cement for increasing the early strength thereof, or for controlling the set, has already been proposed, but it has been found that most of the materials heretofore added for increasing the strength produce an undesirable decrease in time of initial set, while those which have been used for improving the setting properties cause a decrease in early strength. An object of my invention, therefore, is to provide a material which may be admixed with Portland cement either for the purpose of increasing the early strength thereof without unduly decreasing the time of initial set or for the purpose of increasing the setting time (especially at high temperatures), while causing no serious reduction in early strength and in some cases actually increasing the early strength.

The cement composition of my invention comprises essentially Portland cement containing borate of lime, such as the naturally occurring mineral colemanite, and also preferably containing oxy-chloride of lime, both intimately admixed therewith throughout. The effect of borate of lime, or colemanite, alone is to produce a marked increase in initial setting time, both at atmospheric and higher temperatures, but usually at some sacrifice of early strength, while the use of a suitable proportion of calcium oxy-chloride in conjunction therewith causes the early strength of the normal cement to be maintained or increased, while still permitting the desired increase in setting time to be obtained.

Colemanite is a borate of lime occurring naturally in deposits of considerable extent, and the use of this particular borate of lime is, therefore, advantageous from an economical standpoint because of the large available supply and relatively low cost thereof, but it will be understood that it is within the scope of this invention to also use other borate compounds of calcium. For example, effects similar to those obtained with colemanite have also been obtained by the use of calcium metaborate, $Ca(BO_2)_2.2H_2O$.

Pure colemanite has the formula $$Ca_2B_6O_{11}.5H_2O.$$

In Dana's "Minerology", third edition (1922), page 621, it is stated that it consists perhaps of $HCa(BO_2)_3.2H_2O$. Solubility tests indicate that this material acts in solution as a mixture of $H_3BO_3$ and $Ca(BO_2)_2$, thus substantiating the probable formula given above, and it is possible that the liberation of boric acid in solution may play an important part in the effect of this particular compound on the setting properties of the cement.

Considerable variation is possible in the proportions of borate of lime and oxychloride of lime admixed with the cement in order to obtain advantageous setting properties and strength. However, I have found that it is generally necessary to use at least 0.2% and preferably 0.5% or more or colemanite 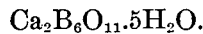 (or other borate of lime containing an equivalent amount of borate radical), in order to properly control the setting time, that is, to cause the cement composition to have a sufficiently long initial setting time at elevated temperatures. Furthermore, in order to maintain satisfactory early strength in conjunction with the increased initial setting time, the proportion of calcium oxychloride to the borate of lime should be kept within fairly close limits. For example when using colemanite, I prefer to use from 2 to 5 parts of calcium oxychloride to 1 part of colemanite. There appears to be no definite upper limit on the amounts of the materials which may be used, but in order to avoid the use of an excessive amount of total admixture I prefer to use not more than about 2% of colemanite (or an equivalent amount of other borate of lime) and a corresponding amount of calcium oxychloride in accordance with the proportion above stated.

In general, therefore, it may be said that the proportion of colemanite in the final composition is preferably between .2 and 2%, the proportion of calcium oxychloride is preferably between 1 and 10%, and furthermore, the ratio of calcium oxychloride to borate of lime is preferably between 2 to 1 and 5 to 1. It will be understood, however, that the above limits are not exact and that moderate departures therefrom may be made without departing from the spirit of this invention. Furthermore, in some cases, a where high early strength is not of great importance and increased setting time is the chief consideration, the borate of lime may be used without the addition of calcium oxychloride.

I have also found that the fineness to which the cement is ground has considerable influence on the amounts of admixture required to obtain a given initial setting time and a given early strength. The effect of increased fineness of grinding is, in general, to increase the early strength and to somewhat decrease the initial setting time. Therefore, as the fineness of the cement is increased, it will in general be desirable to use a relatively lower proportion of calcium oxychloride and a relatively higher proportion of borate of lime. For the best results I prefer to use a cement testing about 95% or more through a 200 mesh sieve.

The cement compositions of my invention may be prepared, in general, by incorporating the modifying materials, consisting of borate of lime and preferably also oxychloride of lime, in finely divided condition and in a uniformly distributed manner, in normal Portland cement. This may be effected by addition of said materials, either previously mixed together or separately, to the finished cement and intergrinding or otherwise thoroughly mixing the same, or by addition of such materials to the normal Portland cement clinker and then grinding the mixture to the desired fineness. I find that somewhat better results are obtained by first mixing the borate of lime and the oxychloride of lime together in exactly the desired proportions, and then adding this pre-mixed admixture to the cement or clinker in the desired proportions. This method is particularly advantageous since I have found that slight variations in the proportion of total admixture in the final composition do not seriously affect either the setting properties or the strength, while changes in the proportions of the borate of lime and the oxychloride to one another in the admixture produce marked changes in such properties. Thus by accurately controlling the composition of the admixture I am enabled to produce a cement composition having substantially uniform setting properties and strength, in spite of slight fluctuations in the ratio of mixing of the admixture with the Portland cement or clinker. Such a material comprising a pre-mixed admixture of borate of lime and calcium oxychloride for addition to Portland cement material may, therefore, be considered as forming part of the present invention. In order that the proportions of the borate and the oxychloride in the finished cement shall be within the preferred range above set forth, such pre-mixed admixture should preferably contain from 2 to 5 parts of oxychloride of lime to 1 part of colemanite by weight. Furthermore these materials may advantageously be ground to a fine state of division, for example such that the major portion thereof will pass through a 200 mesh sieve, before addition to the Portland cement material. Such grinding may be carried out either before or after the two ingredients of the admixture are mixed together.

I also find it advantageous to aid the pre-mixed admixture or the separate admixed materials to the clinker before grinding, so that during the grinding of the clinker to the desired fineness, the admixed materials are interground therewith and are thus uniformly distributed and intimately mixed throughout the entire body of material, without requiring any additional grinding or mixing operation.

As an example of cement compositions in accordance with this invention and the methods of making the same, and to illustrate the effect of the above described admixtures on the setting properties and strength of the composition, the following may be given.

A number of cement compositions were prepared by intergrinding portions of a certain normal Portland cement with varying proportions of colemanite and of oxychloride of lime. In each case the materials to be added were previously ground so that the major portion thereof would pass through a 200 mesh sieve. These materials were then added to the cement in the proportions given and were thoroughly mixed therewith by intergrinding for a period of about one minute. Tests were then made to determine the initial setting time of these different compositions at 205° F., as compared with the normal cement from which they were prepared, these tests being made with slurries containing 48% water. These slurries were placed in shallow tin cans provided with slip-over lids, and the cans were placed on a grid and partially submerged in water in a cylindrical vessel, the walls of which rose several inches above the top of the cans. This container was fitted with a lid which carried a thermometer whose bulb was submerged in the water when the lid was in place. The water in the cylindrical vessel was maintained at a temperature of approximately 205° F. throughout each test. The slurries were first made up in the cans at room temperature, stirred thoroughly, the lids placed on the cans, and the cans then placed in the test vessel. At intervals the lids were removed and the samples tested with a standard Gilmore initial set needle. The lids were replaced after each test, so as to minimize evaporation from the slurries. The results of these tests were as follows:

I.—Tests showing effect on initial setting time at 205° F.

Made with 48% slurries

| Per cent colemanite | Per cent oxy-chloride of lime | Initial setting time (minutes) |
|---|---|---|
| 0 | 0 | 45 |
| 0.8 | 3 | 110 |
| 0.8 | 4 | 76 |
| 1 | 3 | 108 |
| 1 | 4 | 87 |
| 1 | 5 | 70 |
| 1.2 | 4 | 92 |

Tests were also made of the early strength of these cement compositions, in 1:3 mortar, as compared with the normal Portland cement, and the results obtained are illustrated by the following:

II.—Tests showing effect on early strength and on setting time at room temperature (a) Made with 1:3 mortars

| | Setting time initial—final (hours and minutes) | Compressive strength (lbs./sq. in.) | | | |
|---|---|---|---|---|---|
| | | 1-day | 3-day | 7-day | 28-day |
| Normal cement without admixture | 2.30  5.25 | 1,114 | 2,083 | 3,654 | 4,921 |
| With 1 per cent colemanite and 5 per cent oxychloride of lime | 3.40  5.30 | 1,169 | 3,125 | 4,142 | 5,162 |

In order to determine the effect of fineness of the cement on the proportions of admixed materials required to obtain the desired setting properties and strength, and particularly the desired time of initial set at about 205° F., a number of compositions were also prepared and tested, using cements of different finenesses as expressed in total particle surface per unit weight. In testing the setting time of these compositions, it was found that a sharper distinction could be noted, and probably a better indication as to the period during which the slurry would remain sufficiently fluid to give good results by the methods usually employed in cementing oil wells, could be obtained by noting the interval during which the needle used in the setting test completely penetrated the test sample of slurry, whose depth was almost one-half inch. In the following table, therefore, showing the setting properties of these cements in 50% slurries at 205° F., this "time of complete

*III.—Tests showing effect on time of complete penetration and of initial set at 205° F., with cements of different fineness*

Tests made with 50% slurries

| Cement No. | Fineness (% passing 200 mesh sieve) | % colemanite | % oxychloride of lime | Time of complete penetration (minutes) | Time of initial set (minutes) |
|---|---|---|---|---|---|
| 61 | 72 | 0 | 0 | 43 | 90 |
| 61 | 72 | 0.4 | 3 | 77 | 112 |
| 61 | 72 | 0.8 | 3 | 185 | 226 |
| 62 | 86 | 0 | 0 | 38 | 75 |
| 62 | 86 | 0.5 | 0 | 78 | 166 |
| 62 | 86 | 0.5 | 1 | 105 | 161 |
| 62 | 86 | 0.5 | 2 | 90 | 125 |
| 62 | 86 | 0.5 | 2.5 | 90 | 129 |
| 62 | 86 | 0.5 | 3 | 80 | 106 |
| 62 | 86 | 0.6 | 3 | 103 | 137 |
| 62 | 86 | 0.8 | 3 | 130 | 188 |
| 63 | 97 | 0 | 0 | 18 | 52 |
| 63 | 97 | 0.8 | 2.5 | 80 | 111 |
| 63 | 97 | 0.8 | 3 | 70 | 104 |
| 63 | 97 | 0.9 | 3 | 80 | 109 |
| 63 | 97 | 1.6 | 6 | 65 | 120 |

Tests also made of the early strength of compositions prepared from cements of different fineness and with different proportions of added materials, as follows:

*IV.—Tests showing effect on early strength with cements of different fineness*

| Cement No. | Fineness (% passing 200 mesh sieve) | % colemanite | % oxychloride of lime | Compressive strength—1:3 mortars (lbs./sq. in.) | | |
|---|---|---|---|---|---|---|
| | | | | 1-day | 3-day | 7-day |
| 62 | 86 | 0 | 0 | 514 | 1,484 | 2,827 |
| 62 | 86 | 0.4 | 0 | 604 | 1,637 | 2,523 |
| 62 | 86 | 0.5 | 2.5 | 744 | 2,016 | 2,823 |
| 63 | 97 | 0 | 0 | 801 | 2,315 | 4,416 |
| 63 | 97 | 0.8 | 2.5 | 1,521 | 3,264 | 4,148 |
| 63 | 97 | 1.6 | 6.0 | 1,541 | 3,620 | 4,353 |

The above tabulated results show that by the use of borate of lime, preferably in conjunction with oxychloride of lime, in proportions such as above stated, it is possible to produce cement compositions having entirely satisfactory initial setting times at elevated temperatures, and particularly compositions having initial setting times of from one-half to two hours or longer at about 205° F., without detracting from the early strength of such compositions as compared with normal Portland cement and without adversely effecting the setting properties thereof at room temperature. The results also indicate that the best results are obtained when the ratio of oxychloride of lime to borate is kept within rather close limits, and that, in general, the higher the percentages used, while preserving this ratio within these limits, the longer is the initial setting time and the greater is the early strength of the resulting composition. It is also shown that much better results, and particularly more satisfactory early strength, can be obtained by the addition of the above described admixtures to the cement of a relatively high degree of fineness, namely, in excess of 95% passing a 200 mesh sieve, than with a cement having a lower degree of fineness.

I claim:

1. A Portland cement composition comprising Portland cement containing borate of lime and oxychloride of lime intimately admixed therewith.

2. A Portland cement composition comprising Portland cement containing colemanite and oxychloride of lime, the ratio of the oxychloride to the colemanite being between 2 to 1 and 5 to 1.

3. A Portland cement composition comprising Portland cement containing borate of lime in an amount equivalent to between 0.5% and 2% colemanite and also containing between 1% and 10% calcium oxychloride.

4. A Portland cement composition comprising Portland cement containing borate of lime in an amount equivalent to between 0.5% and 2% colemanite and also containing between 1% and 10% calcium oxychloride, the ratio of the calcium oxychloride to the colemanite equivalent of the borate of lime being between 2 to 1 and 5 to 1.

5. The method of making Portland cement composition which comprises incorporating borate of lime and oxychloride of lime, in finely divided condition and in a uniformly distributed manner, in normal Portland cement.

6. The method of making a Portland cement composition which comprises adding borate of lime and oxychloride of lime to Portland cement material and intergrinding the mixture.

7. The method of making Portland cement composition which comprises mixing borate of lime in an amount equivalent to 1 part by weight of colemanite with 2 to 5 parts by weight of oxychloride of lime, and thoroughly mixing the resulting mixture with Portland cement.

8. The method of making a Portland cement composition which comprises mixing borate of lime and oxychloride of lime in definite proportions, adding the resulting mixture to Portland cement clinker, and intergrinding said materials until at least 95% will pass through a 200 mesh sieve and the borate of lime and oxychloride of lime are thoroughly mixed with the Portland cement.

9. A material for admixture with Portland cement material comprising the naturally occurring colemanite and oxychloride of lime in powdered condition, and ratio of oxychloride to colemanite being between 2 to 1 and 5 to 1.

10. A material for admixture with Portland cement material comprising borate of lime and oxychloride of lime.

11. A material for admixture with Portland cement material comprising borate of lime in an amount equivalent to 1 part by weight of colemanite, and from 2 to 5 parts by weight of oxychloride of lime.

In testimony whereof I have hereunto subscribed my name this 23rd day of September, 1930.

HAROLD H. STEINOUR.